(12) United States Patent
Skolaude

(10) Patent No.: US 10,695,823 B2
(45) Date of Patent: Jun. 30, 2020

(54) DRIVE UNIT FOR A SETTING DEVICE, IN PARTICULAR A RIVET SETTING DEVICE

(71) Applicant: RIBE ANLAGENTECHNIK GMBH, Schwabach (DE)

(72) Inventor: Andreas Skolaude, Schwabach (DE)

(73) Assignee: RIBE Anlagentechnik GmbH, Schwabach (DE)

(*) Notice: Subject to any disclaimer, the term of this patent is extended or adjusted under 35 U.S.C. 154(b) by 450 days.

(21) Appl. No.: 15/722,487

(22) Filed: Oct. 2, 2017

(65) Prior Publication Data

US 2018/0021844 A1    Jan. 25, 2018

Related U.S. Application Data

(63) Continuation of application No. PCT/EP2016/056869, filed on Mar. 30, 2016.

(30) Foreign Application Priority Data

Apr. 2, 2015   (DE) .................. 10 2015 205 995

(51) Int. Cl.
*B21J 15/26* (2006.01)
*H02K 7/06* (2006.01)
(Continued)

(52) U.S. Cl.
CPC ............... *B21J 15/26* (2013.01); *H02K 7/06* (2013.01); *B21J 15/043* (2013.01); *B21J 15/28* (2013.01);
(Continued)

(58) Field of Classification Search
CPC . B21J 15/26; B21J 15/043; B21J 15/28; B21J 15/30; H02K 7/06; H02K 5/06; H02K 5/18
(Continued)

(56) References Cited

U.S. PATENT DOCUMENTS 1,454,777 A    5/1923   Walker
1,483,919 A    2/1924   Walker
(Continued)

FOREIGN PATENT DOCUMENTS

CN    203804123 U    9/2014
DE    2659650 A1    11/1978
(Continued)

*Primary Examiner* — David B Jones
(74) *Attorney, Agent, or Firm* — Laurence A. Greenberg; Werner H. Stemer; Ralph E. Locher

(57) ABSTRACT

A drive unit is configured for a stamping rivet setting device and has an electric direct drive which contains motor components that concentrically surround a control element which can be linearly moved in the axial direction. In order to absorb the required torques while allowing a compact construction of the device, in particular in relation to a component side, a drive housing has an asymmetrical configuration in a connecting region between a main part and a guide part in which the control element is guided, for the purpose of asymmetrical torque transmission. In addition or alternatively thereto, the highly compact construction achieves an efficient cooling by an inner cooling unit, in particular air flowing through a free inner space in which the motor components are arranged.

20 Claims, 3 Drawing Sheets

(51) Int. Cl.
  *H02K 5/18* (2006.01)
  *H02K 5/06* (2006.01)
  *B21J 15/04* (2006.01)
  *B21J 15/28* (2006.01)
  *B21J 15/30* (2006.01)

(52) U.S. Cl.
  CPC .............. *B21J 15/30* (2013.01); *H02K 5/06* (2013.01); *H02K 5/18* (2013.01)

(58) Field of Classification Search
  USPC .................................................. 29/243.526
  See application file for complete search history.

(56) References Cited

U.S. PATENT DOCUMENTS

| | | | |
|---|---|---|---|
| 5,088,362 A | | 2/1992 | Schalles |
| 5,100,271 A | | 3/1992 | Kameyama et al. |
| 5,473,805 A | * | 12/1995 | Wille ............... B21J 15/26 29/243.526 |
| 6,676,000 B2 | | 1/2004 | Lang et al. |
| 9,339,865 B2 | | 5/2016 | Skolaude |
| 2010/0275424 A1 | * | 11/2010 | Masugata .......... B21J 15/043 29/243.521 |

FOREIGN PATENT DOCUMENTS

| | | |
|---|---|---|
| DE | 3910083 A1 | 10/1989 |
| DE | 3902592 C1 | 3/1990 |
| DE | 20106207 U1 | 7/2001 |
| DE | 202004007595 U1 | 8/2004 |
| DE | 102013012223 A1 | 2/2014 |
| EP | 0415138 A2 | 3/1991 |

* cited by examiner

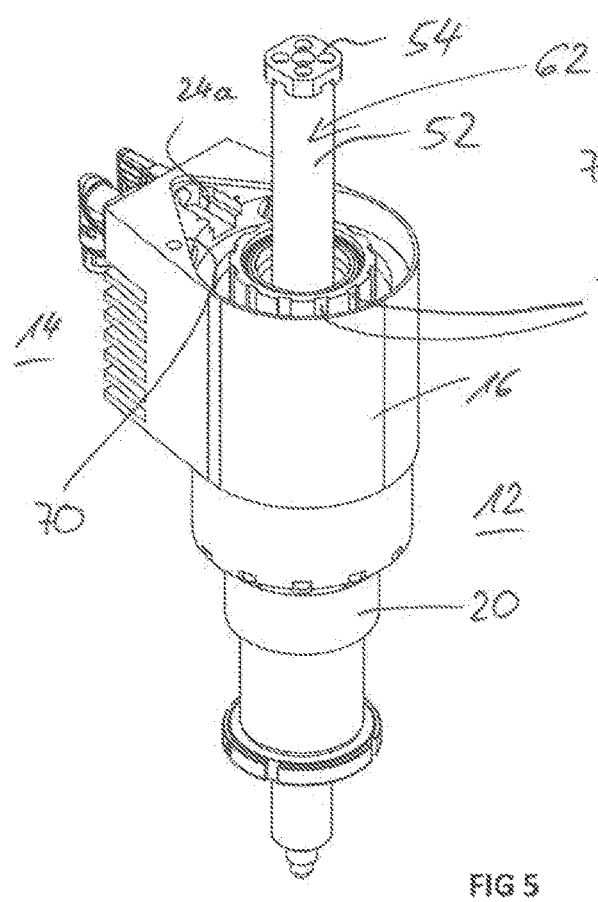
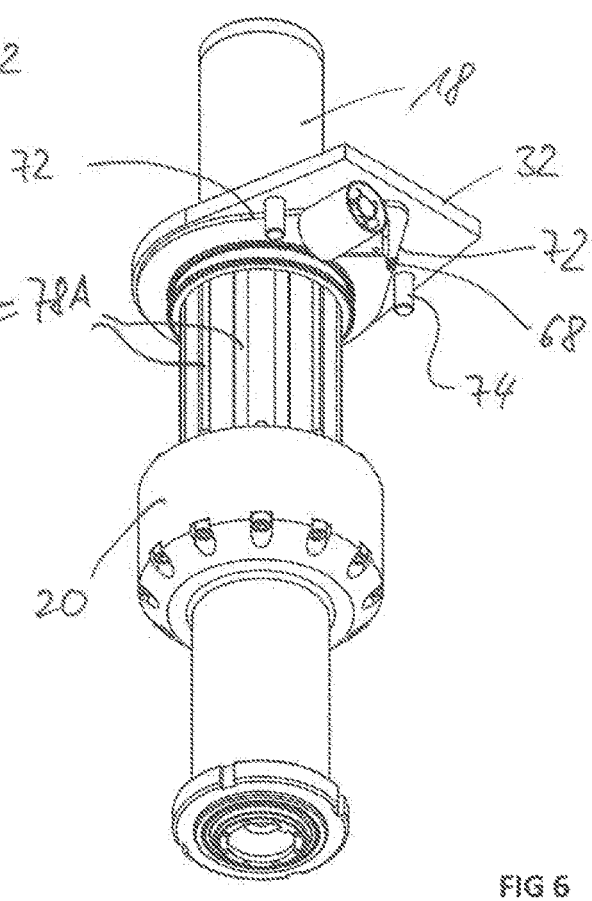
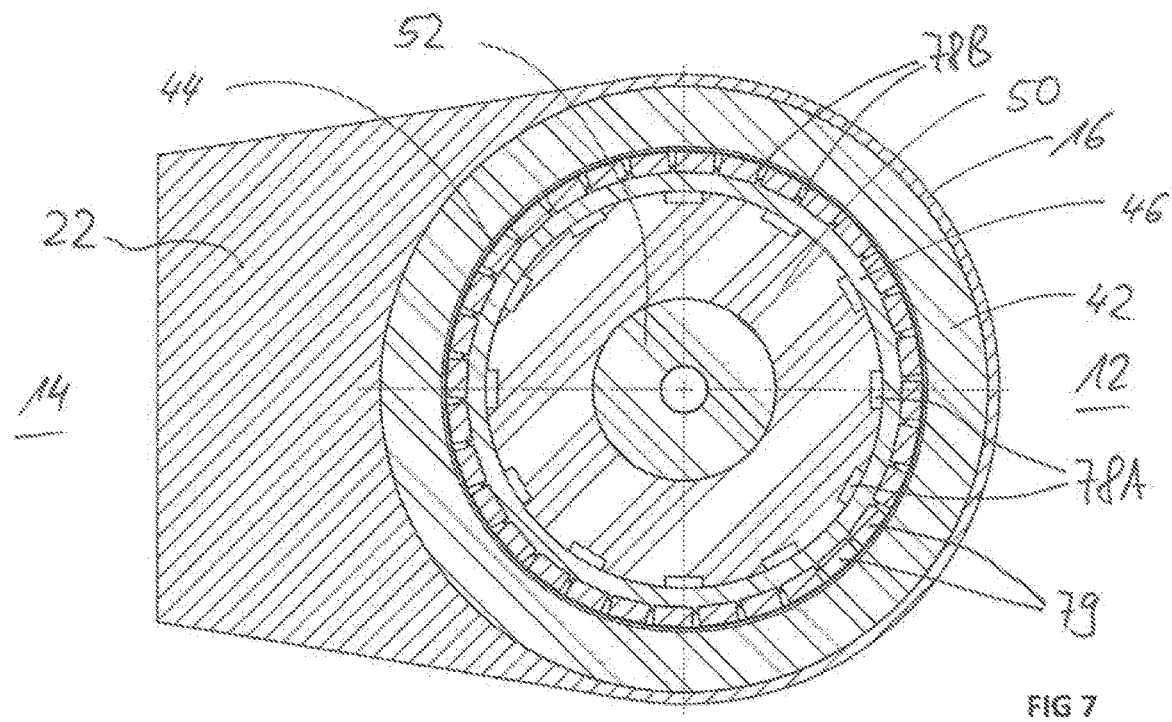

DRIVE UNIT FOR A SETTING DEVICE, IN PARTICULAR A RIVET SETTING DEVICE

CROSS-REFERENCE TO RELATED APPLICATION

This application is a continuation, under 35 U.S.C. § 120, of copending international application No. PCT/EP2016/056869, filed Mar. 30, 2016, which designated the United States; this application also claims the priority, under 35 U.S.C. § 119, of German patent application No. DE 10 2015 205 995.2, filed Apr. 2, 2015; the prior applications are herewith incorporated by reference in their entireties.

BACKGROUND OF THE INVENTION

Field of the Invention

The invention relates to a drive unit for a setting device, in particular for a rivet setting device.

Such a drive unit can be found in published, non-prosecuted German patent application DE 10 2013 012 223 A1, corresponding to U.S. Pat. No. 9,339,865. The disclosed drive unit is a direct drive where motor components, namely a rotor and a stator, surround the actuator element concentrically. The motor components and the actuator element, in this case, are mounted in a common drive housing.

Along with the concept of the direct drive with the motor components surrounding the actuator element in a concentric manner, solutions are also known where the electric motor is mounted laterally next to a setting unit and is coupled with the actuator element, for example by a gear drive. However, this requires a marked increased installation space at least toward one side.

In the case of such a drive unit, in general the rotational movement of the electric motor is converted into a linear actuator movement of the actuator element. A punch is moved against a work-piece by use of the actuator element, in this connection the punch is pressed at a high force against the work-piece. The punch can be realized itself, in this connection, as a processing tool, such as, for example, a punching tool. Such a drive unit, however, is preferably used to press a connecting element into a component. The connecting element, in this connection, is in particular a pressing element, such as, for example, a press nut, a press bolt and in particular a rivet, preferably a self-piercing rivet. In this case, therefore, two components, in particular two metal sheets, are generally connected together using the connecting element.

Such drive units are used, in particular, in the automobile industry for connecting two components together. Self-piercing rivet technology has replaced spot welding, in particular in the case of hybrid components, that is to say when connecting components ("sheets") produced from different, also non-metal materials. The drive unit, in this connection, is fastened on a machine tool, which can also be, in particular, a robot arm of an industrial robot. High cycle rates are demanded for setting the connecting elements. In order to ensure a reliable connection, the drive unit has to exert a very high setting force which acts in the axial direction. In particular when setting self-piercing rivets, the setting force is, for example, in excess of 50 kN. This demands correspondingly large and robust dimensioning of the drive unit.

At the same time, however, on account of the complex component geometry, in particular in the case of vehicle bodies, as compact a drive unit as possible is demanded which has as few interfering contours as possible in order to be able to set the rivets reliably even in tight installation areas. In addition, a low weight is striven for in order to keep the accelerating masses small when moving the machine tool, e.g. the robot arm.

A typical setting operation in particular of a self-piercing rivet is subdivided, in this case, into a feed path where the self-piercing rivet is fed to the component and the subsequent actual setting operation where the setting force increases in an almost abrupt and powerful manner.

SUMMARY OF THE INVENTION

Proceeding from here, the object underlying the invention is to provide a compact drive unit in particular for a rivet setting device.

The object is achieved according to the invention by a drive unit with the features of the main claim. The drive unit includes, in this connection, an electric direct drive, in particular a servomotor, with a rotor pack and a stator pack as motor components. In addition, the drive unit includes an actuator element which is displaceable linearly in an axial direction by the direct drive, the actuator element being concentrically surrounded by the motor components for this purpose. The actuator element and the motor components are accommodated, in this case, in a free interior of a common drive housing. The drive housing contains, in this case, a front component side and a rear machine side. A front region of the drive unit, which faces the component to be processed in operation in the mounted state, is understood in this connection as the component side. Correspondingly, a rear region of the drive unit, which is situated in operation on a rear side remote from the component, is understood as the machine side. In this case, a very compact construction with a smaller radial extent is required in particular toward the component side.

The terms rotor pack or stator pack are to be understood in the present case in general as the necessary electromagnetic components of the electric motor, such as, for example, a coil winding and/or permanent magnets for realizing the rotor or stator. In addition, a drive element, in particular a spindle element, especially a spindle nut, is necessary for converting the rotational movement of the rotor into the linear movement of the actuator element. The drive element is also designated in the present case as a motor component.

The drive housing additionally contains a main part and a guide part which is connected to the main part in a connecting region. The guide part, in this case, is realized in the axial direction in particular as a rear end part of the drive housing. The actuator element, in this case, is guided inside the guide part in particular so as to be slidingly displaceable. On account of the forces occurring during the setting operation, in particular when there is an abrupt increase in an axial setting force, a torque when the rotational movement is converted into the axial actuating movement also increases powerfully. In order to absorb the high torque reliably and at the same time having a compact design, the main part and the guide part—when viewed in a plane perpendicular to the axial direction—contain an asymmetric design in the connecting region in such a manner that the torque is transmitted in an asymmetric manner. An asymmetric torque transmission is to be understood, in this connection, as the torque not being transmitted from the motor components to the drive housing in a uniformly distributed manner in the axial direction and neither consequently about a rotational axis of the direct drive. The rotational forces are consequently not actually distributed uniformly about the periphery of the drive housing. Rather, the drive housing is realized in such a manner that a larger part and preferably the main part of the torque is absorbed in the rear part of the drive housing toward the component side. Torque transmitting elements, which interact together via torque surfaces to transmit the torque, are arranged, in this case, in the connecting region between the guide part and the main part. The torque transmitting elements are consequently arranged at least predominantly and preferably completely on the machine side. Transmitting a main part of the torque or the term completely is to be understood, in this connection, as at least more than 70 and in a preferred manner more than 90% of the overall torque being transmitted on the machine side and that consequently, at best, a smaller torque transmission is effected between the guide part and the main part on the component side.

The measure achieves the particular advantage of the drive housing and consequently the entire drive unit being able to be realized in an extremely compact and space-saving manner toward the component side. Correspondingly, fewer interfering contours are consequently realized toward the relevant component side and the drive unit only has a small radial extent toward the component side.

In a preferred design, it is provided, in this case, that the torque transmission is effected exclusively on the machine side. The torque transmitting surfaces provided for the torque transmission are consequently arranged exclusively on the machine side.

With regard to as compact a configuration as possible, the main part also contain, in this case, just a thin housing wall precisely in the connecting region on the component side, whereas toward the machine side it contains a solid wall by which the torque is able to be absorbed. The housing wall toward to the component side, in this case, is simply a thin metal wall. For reasons of weight, the housing is preferably realized fundamentally from a preferably metallic, light-weight construction material, in particular aluminum. In this case, the wall thickness is preferably simply between 2 and 4 mm, and in a preferred manner is 2.5 mm.

Overall, the drive housing contains an asymmetric configuration when viewed in a plane perpendicular to the axial direction. The main part is preferably realized, in this case, toward the component side as a part cylinder, in particular a half-cylinder. Consequently, when viewed in cross section, the main part—at least in the connecting region—is realized toward the component side as a part circle. Toward the machine side, the main part, in contrast to this, is preferably realized in an approximately block-shaped manner such that the main part therefore toward the machine side, when viewed in cross section, contains a polygonal, in particular approximately rectangular and preferably a trapezoidal cross-sectional area. Correspondingly, the guide part in the connection region is realized in a complementary manner to this.

With regard to the design being as compact as possible in particular toward the component side, it is provided, in this case, in an expedient manner that the radial extent of the main part to the machine side is greater by at least 25% and preferably by at least 40 or 50% than its radial extent toward the component side. The maximum radial extent toward the component side, in this case, is preferably a maximum of between 60 and 70 mm and is preferably simply 65 mm. Correspondingly, the radial extent toward the machine side is clearly in excess of this and in particular is within the range of between 80 and 100 mm.

With regard to a reliable transmission of the torque, the corresponding torque transmitting surfaces are realized as large as possible. In an expedient manner, in this case, the main part and the guide part interlock in a positive locking manner to realize the torque transmitting surfaces. In particular, there are consequently no connecting elements, such as screws, which are used for the torque transmission. At best small intermittent torque transmitting surfaces would be realized in the case of screws or other bolt-shaped elements that extend in the axial direction. The torque transmitting surfaces are realized, in this case, on a peripheral contour as a result of the positive-locking interlocking. With regard to the asymmetrical torque transmission, the peripheral contour, also designated as the engagement contour, is realized asymmetrically. In particular, once again a main part of the torque transmitting surfaces and preferably all the torque transmitting surfaces are realized by the engagement contour in the region toward the machine side. This allows for a corresponding thin-walled design of the drive housing in the region toward the component side.

In an expedient manner, the engagement contour—when viewed in a plane perpendicular to the axial direction—has a part-circular progression toward the component side. The engagement contour consequently does not provide any contact surface for torque transmission toward the component side.

In addition, the engagement contour, when viewed in cross section, is preferably realized toward the machine side in the manner of a polygon and in particular in a triangular manner. Overall, the main part consequently contains a cross sectional area that is formed by a polygon and by a part-circle that connects thereto. The part-circle is preferably at least a semi-circle.

The torque transmission is preferably effected exclusively, at least 90%, by means of the engagement contour.

The engagement contour, in this case, is expediently realized on an underside of a fastening flange. The guide part is placed with the fastening flange onto the main part of the drive housing and is connected to the same. The engagement contour consequently extends in the axial direction into the main part of the drive housing. The lateral surface of the contact contour, which realizes the torque-transmitting surfaces toward the machine side, rests, in this case, in a precise-fitting manner in a corresponding receiving contour on the main part. When viewed in a longitudinal section, an approximately step-like design is achieved as a result of realizing the engagement contour on the underside of the fastening flange.

In a rear region, the guide part additionally contains a tubular part region in which the actuator element is guided in a slidingly displaceable manner. The tubular part region extends at least to the fastening flange.

The tubular part region preferably projects a little into the main part and forms an abutment e.g. for a bearing arrangement of the motor component.

For the non-rotatable displacement of the actuator element inside the tubular rear part region, a corresponding anti-rotation element, which is realized in particular as a polygonal sliding element, is realized on the actuator element. The sliding element is connected in a non-rotatable manner to the actuator element in the manner of a plate-shaped element in particular on the rear side of the actuator element.

In operation, the actuator element is displaced in the axial direction by a defined feed stroke by the direct drive. In the case of the maximum feed stroke, the actuator element is situated, in this case, in an extended position. The drive unit is configured with regard to its dimensions preferably in such a manner that in the extended position, the anti-rotation element is positioned at the same axial height of the connecting region in which the torque transmitting surfaces are realized. The design is based on the consideration that the maximum torque typically occurs in the extended state and that as direct a transmission as possible of the torque should then be effected from the actuator element via the anti-rotation element to the drive housing without there being too large an axial distance between the torque transmitting surfaces and the anti-rotation element. The term "at the same axial height" is understood in this connection as, in the extended position, the anti-rotation element being precisely at the height of the connecting region and of the torque-transmitting surfaces or being at a spacing in the axial direction of a maximum of between 10 and 20 mm from the connecting region, that is to say from the engagement contour.

For realizing the direct drive, the actuator element is realized in a rear region preferably as a spindle which is surrounded in a part region by a spindle nut. The spindle nut itself is once again non-rotatably connected to the rotor pack of the direct drive. To this end, the spindle nut is preferably fastened on the radial inside of a rotor sleeve and the rotor pack is fastened on the outside of the rotor sleeve. Correspondingly, the stator pack is then arranged radially on the outside of the rotor pack.

As a result of the configuration with the rotor located in the inside, a very compact design of the entire drive unit overall is ensured.

On account of the necessary high setting forces, the drive unit is realized overall in a suitable manner and is capable of generating an axial force onto the actuator element of >50 kN and in particular of >60 kN. On account of the special setting operation in the case of a self-piercing rivet setting operation, the force occurs as a short-term peak load. The direct drive is correspondingly configured in order to be able to generate the forces and is configured for peak current consumption of >30 A and in particular of >40 A up to preferably 60 A. The electric motor additionally contains overall, in this case, an electric peak performance of several kW, in particular of between 2 and 4 kW. Peak performance for a self-piercing rivet operation, in this case, is applied, for example, for a duration in each case within the range of between 100 and 150 ms. As during the peak performance at best only a small axial adjustment is still effected, an extremely high power dissipation, which is also several kW, occurs during the peak performance during the actual setting operation. The power dissipation is thus, for example, approximately 2.5 kW. On account of the high cycle rates additionally striven for, this means that the direct drive overall is also exposed to a high thermal load.

In order to provide for a cooling of the drive unit, in a preferred configuration the main part of the drive housing toward the machine side and preferably exclusively toward the machine side is consequently additionally provided with a cooling rib structure.

On account of the high thermal load and the extremely compact design, there is, however, the risk that even with such a cooling rib structure only deficient cooling is achieved. In principle, it is possible to provide the main part with coolant channels, through which, therefore, a cooling fluid is then run in the solid material of the main part for cooling the main part. As in the case of such electric drive units, hydraulic connections should be dispensed with as much as possible, hydraulic cooling is not desirable.

Proceeding from this point, a further aspect of the invention underlying the invention is to ensure reliable cooling of such a drive unit in a reliable manner even in the case of a compact design.

In order to ensure sufficient cooling, a cooling device is arranged in the main part in a preferred manner simply toward the machine side for the internal cooling of the motor components. To this end, the cooling device is realized in such a manner that a fluid can flow into the interior of the drive housing. The fluid, in this case, is in particular gas/air and not a hydraulic liquid. The use of a liquid, however, is not in principle excluded.

A decisive consideration in this connection is that the free interior in which the motor components are arranged is traversed directly by the fluid. Contrary to, for example, in the case of simply hydraulic housing cooling systems where a corresponding fluid simply flows through the solid wall of the main part or of a cooling body, as a result of the internal cooling proposed here, the cooling fluid is therefore guided directly through the interior in which the components are stored. This results therefore in the heat being output directly from the motor components to the fluid such that direct, immediate and consequently efficient cooling is affected. Sufficient cooling is also ensured consequently, in particular, when using air as fluid as a result of the direct cooling. Therefore, any hydraulic components for the cooling and in particular also for the entire drive unit are preferably dispensed with.

To realize the cooling device, cooling channels, which open out from an outside into the free interior of the drive housing, are realized, in this case, inside the main part. In an expedient manner, the cooling channels are realized, in this case, as bores. In a preferred manner, in this case, realized on the inflow side is an in particular single feed channel which then opens out into a free annular chamber, which is therefore realized as a quasi-distributing chamber such that the inflowing fluid is distributed on the periphery as uniformly as possible.

At a spacing in the axial direction from this, realized in an expedient manner on an outflow side is also a free annular chamber which serves as a collecting chamber and extends from the at least one outlet channel in the radial direction to an outside of the main part. The corresponding connections for the fluid are arranged in a preferred manner on an outside of the main part on the machine side such that no connections are present on the component side. The two annular chambers on the inflow side and outflow side are realized, in this case, in each case on the end of the motor components. In operation, the fluid consequently flows via the feed channel into the distributor annular chamber on the inflow side, then flows in the axial direction past the motor components distributed over the entire periphery and reaches the collecting chamber on the outflow side and leaves the collecting chamber via corresponding outlet channels.

Flow channels which are realized as grooves for the fluid are realized in an expedient manner for cooling along the motor components. The grooves extend, in this case, in particular directly along at least one of the motor components. The grooves, in this case, are preferably distributed about the periphery and are realized, in particular, distributed in an equal manner. For example, more than five and preferably more than eight, for example between eight and 15 flow channels are realized. As a result of additionally providing such flow grooves, a large cross-sectional flow area is provided overall such that, overall, only a small amount of dynamic pressure is created and consequently a sufficient cooling current and consequently sufficient cooling is ensured.

Grooves are to be understood in general as groove-like channels which extend from the inflow side to the outflow side. They run, for example, in a straight line as longitudinal grooves. They can, in principle, however, also assume a meander-shaped progression.

The motor components, especially the rotor pack or the stator pack are usually fastened, in this case, on a carrier. In a preferred manner, the carrier preferably contains the grooves for realizing the flow channels. Efficient direct cooling of the at least one motor component is achieved as a result of the measure. The motor component is, in particular, the rotor pack which is fastened on the already mentioned rotor sleeve. The grooves are worked into the outside of the rotor sleeve, on which the rotor pack is also fastened.

In an expedient design, the grooves are arranged on a side of the carrier located opposite the motor components (rotor pack or stator pack). They do not necessarily have to be incorporated in the carrier in this case. The consideration underlying said design is that a high packing density of the individual magnets, for example of the rotor pack, is frequently necessary for electrical reasons such that on the side of the carrier facing the magnets, no sufficient space is made possible for providing grooves as flow channels.

In the case of the design preferred here, the carrier is realized as a rotor sleeve which is connected to a drive element especially of the spindle drive and in particular to the spindle nut for transmitting the rotational movement. In a preferred manner, the grooves are then provided in the outer casing of the spindle nut to which the rotor sleeve is non-rotatably connected. The rotor sleeve, in this case, surrounds the spindle nut in a typically concentric manner and in a preferred manner abuts—up to the grooves—over the entire surface against the outer casing of the spindle nut.

In order to ensure sufficient cooling and in particular in addition to the grooves, spaces or gaps inside the motor components, in particular between the individual magnets, are utilized as further flow channels, i.e. they are incorporated in the cooling path from the inlet side to the outlet side.

In an expedient manner, the entire cross-sectional area of the flow channels is generally equal to or greater than a cross sectional area of a feed channel, via which the fluid is supplied. The dynamic pressure is kept low as a result. If just grooves are used as flow channels, they form the overall cross-sectional area exclusively. If the gaps are additionally used as flow channels, they contribute to the overall cross-sectional area.

A pump element, which is directly incorporated in a preferred manner into a channel portion in particular of the feed channel, is additionally arranged with regard to the necessary traversing of the main part by the fluid. When using air as fluid, the pump element is realized, in this case, especially as a fan or blower. In an expedient manner, air is sucked-in out of the surrounding area by the pump element such that a connection to a cooling circuit is therefore not necessary.

In an expedient manner, the blower is realized, in this case, for an air flow of several 10 l/min and preferably of in excess of 100 l/min. It is especially realized for an output of between 120 and 150 l/min.

The pump unit, in this case, is additionally preferably a control and/or regulatable pump element, the delivery capacity of which is controlled or regulated in dependence on a current cooling requirement.

On account of the displaceable bearing arrangement of the actuator element inside the drive housing, the actuator element is usually guided in a slidingly displaceable manner by lubricant such as, for example, oil or grease. In an expedient further development, a flow chamber for the fluid, which is sealed toward the actuator element, is now realized inside the drive housing. The seal consequently ensures that the fluid does not come into contact with such lubricants such as oil, bearing grease etc. Such contact would result, on the one hand, in stress and contamination of the interference components for the fluid, especially also for the blower. On the other hand, there would also be lubricant consumption as a result which would lead either to increased maintenance expenditure or to a shortened service life. This is consequently avoided in an advantageous manner by the sealed flow chamber.

For sealing the flow chamber, the fluid consequently flows simply between two sealing regions which are axially spaced apart from one another. The sealing regions are obtained in particular by sealed bearings by way of which the rotor sleeve is mounted. In particular, when a flow is guided along the longitudinal grooves on the outside of the rotor sleeve, flow guiding is consequently ensured in an (annular) chamber outside of the actuator element in combination with the sealed bearings and consequently contact with the lubricant is avoided.

With regard to a desired compact design, the drive unit has an overall length which is composed of twice the actuating stroke plus a constant which is simply within the range of between 70 and 100 mm. The actuating stroke in the case of such drive units is typically within the range of between 120 and 200 mm and is preferably, for example, within the range of 160 mm. The overall length, in particular, on account of the previously described concepts and of the fundamental design as a direct drive is consequently simply approximately between 390 and 420 mm in the case of an actuating stroke of 160 mm.

The constant corresponds, in this case, in particular to a length of the spindle nut.

In order to achieve as compact a design as possible overall, especially a short installation length, a drive unit is provided. In the case of conventional drive units, the actuator element is realized in multiple parts, the rear part being realized by a spindle element, conventionally the spindle and a front plunger. The spindle, in this case, is provided with a spindle thread and is conventionally realized as a separate construction unit. The separate construction unit is connected to the plunger in a connecting region.

In order to achieve as compact and short a design as possible, it is now provided according to the invention that the spindle element and the plunger are realized as a one-piece part without mechanical connecting elements. In particular, the two parts are realized from a common workpiece, no connecting parts are therefore present between the two parts, neither as a result of mechanical nor other connections. In the case of conventional designs, a connection, which can accept high forces, is necessary between the two separate parts on account of the high torque occurring. In a corresponding manner, the connecting region is also configured in a comparatively large manner. As a result of one-piece design, a clearly shorter design can now be achieved. A further advantage of the one-piece design can be seen in the improved rigidity of the entire actuator element.

The design is advantageous in particular in the case of drive units where the plunger is realized as a tube in which further components are received. Thus, it is necessary, for example, in the case of many setting operations for a hold-down device, for example for pressing the components, to be provided. Especially in the case of such designs with an integrated hold-down device, the hold-down device is guided on the plunger, in particular inside the plunger tube, so as to be slidingly displaceable against the spring force of a spring element.

As a result of the measures described here, an extremely compact drive unit overall is achieved in particular for a rivet setting device which contains simply a short overall length with at the same time a small radial extent at least toward the component side. Such a drive unit is conventionally fastened on a holder of a machine. The holder is preferably a C frame. The drive unit is held expediently in the C frame by way of a front part region of the drive housing. In addition, the actuator element conventionally contains the plunger on its front end. The actuator element is consequently realized overall as a spindle in its rear part region and as a plunger in its front region, for example as a plunger rod or also as a plunger tube. The plunger moves, in this case, in the axial direction to exert the feed stroke at the front out of the front end of the drive housing. In addition, a punch and additionally a hold-down device and/or an automatic feed unit for fastening elements, in particular rivets, is conventionally realized on the plunger. The rivets are fed in this connection, in particular, by a feed hose.

The drive unit described here is not limited to use with self-piercing rivet devices, but is generally useable for applications where high axial linear forces are necessary in the case of compact installation space, in particular for applications in the field of mechanical joining technology. In a preferred manner, the drive unit is used with joining or setting units by way of which joining or connecting elements are inserted, in particular pressed, into a component. The connecting elements are, for example, automatic punching elements such as, for example, self-piercing rivets or piercing nuts or also other pressing elements, such as nuts or bolts, for pressing into a pre-punched (metal) component.

Other features which are considered as characteristic for the invention are set forth in the appended claims.

Although the invention is illustrated and described herein as embodied in a drive unit for a setting device, in particular a rivet setting device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 5 is a perspective view of the drive unit, a guide part of the drive housing, among other things, being blanked out;

FIG. 6 is a perspective view of the drive unit where, among other things, a main part of the drive housing is blanked out; and FIG. 7 is a sectional view taken along the cutting line VI-VI in FIG. 2.

DETAILED DESCRIPTION OF THE INVENTION

Identically acting parts are provided with the identical references in the figures.

Figure 1:
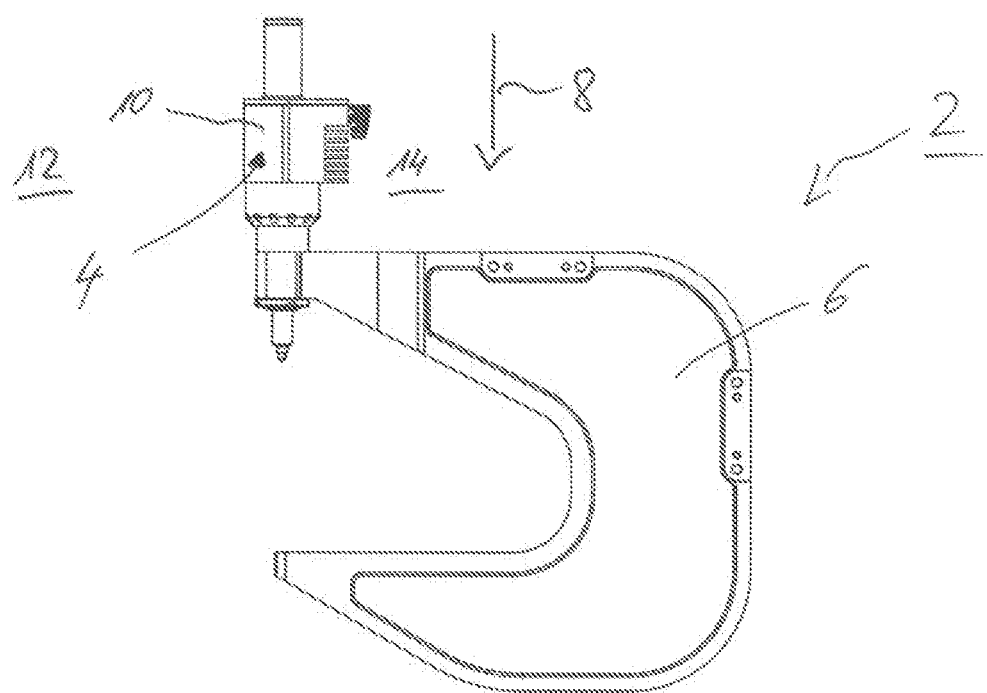
FIG. 1 is a diagrammaticm, side view of a setting device, in particular a rivet setting device, with a holder in the shape of an arched C, on which a drive unit is fastened according to the invention.

Referring now to the figures of the drawings in detail and first, particularly to FIG. 1 thereof, there is shown a setting device 2 which includes a drive unit 4 which is fastened on a holder 6 which is realized in particular as a C-frame. The drive unit 4, in this case, is fixedly gripped in a front part region by an upper arm of the holder 6. The setting device 2 is a punching device for inserting self-piercing rivets (not shown in any detail here) into components to connect two components. In this connection, the components are moved into the C-frame, then a self-piercing rivet is moved by the drive unit 4 against the components to be connected and the components to be connected are connected by the self-piercing rivet. The lower frame arm, in this case, forms an abutment. Such a setting device 2 is used in particular for connecting components in the case of motor vehicles. The holder 6, in this connection, is fastened in particular on a movable machine part, for example on a robot. As an alternative to this, the components to be joined or even an entire automobile body can be moved correspondingly into the opening of the holder 6.

The drive unit 4 extends overall from a rear end in an axial direction 8 to a front end. It contains a drive housing 10 which has a front side which is designated as a component side 12 and a rear side which is designated as the machine side 14. The sides are, with reference to the axial direction 8, oppositely located outsides of the drive unit 4, specifically the side which is oriented to the holder 6 in the mounted state (machine side 14) or is oriented directed away from the holder 6 (component side 12).

Figures 2, 3:
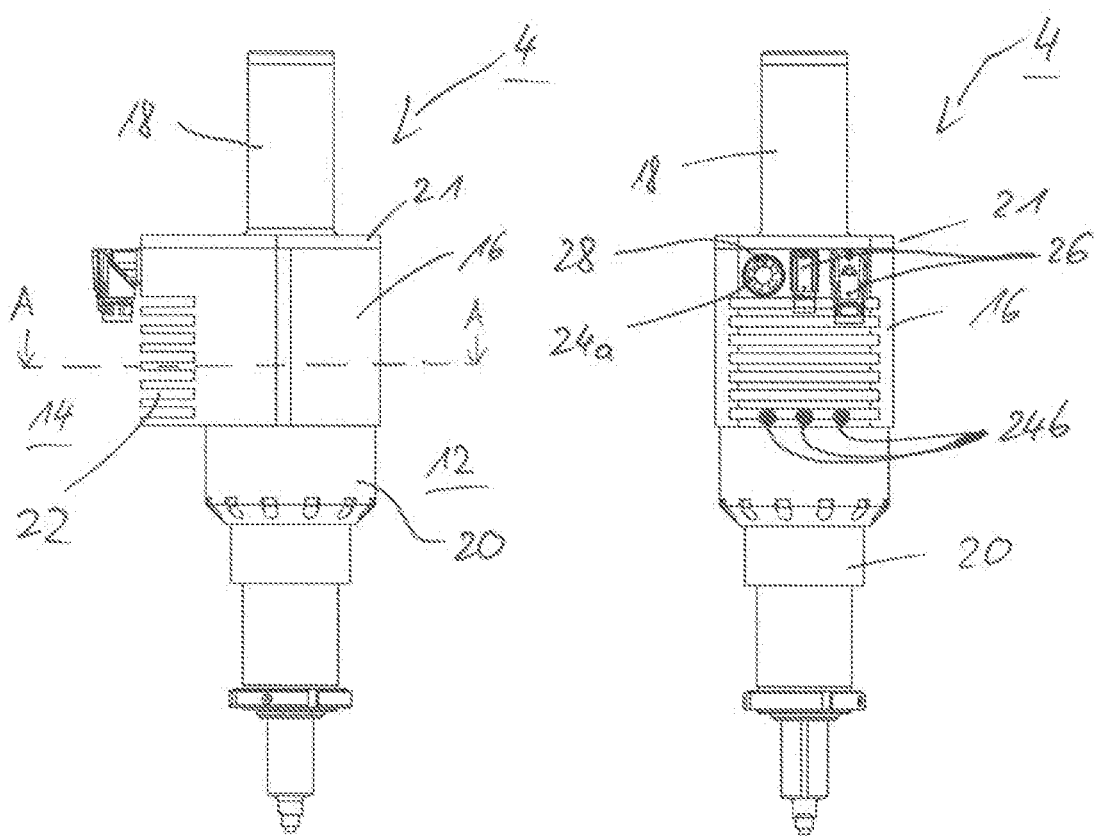
FIG. 2 is a side view of the drive unit shown in FIG. 1.
FIG. 3 is a side view of the drive unit shown in FIG. 1.

The basic geometry of the drive unit 4 and in particular also of the drive housing 10 can be found in FIGS. 2 and 3. The drive housing includes a central main part 16, a rear guide part 18 and a front, further guide part 20. While the guide parts 18, 20 are realized in a manner substantially rotationally symmetrical to the axial direction 8 with cylindrical lateral surfaces—in the event of the rear guide part 18 up to a connecting region 21 to the main part 16—the main part 16 is realized asymmetrically with reference to the axial direction 8 and not rotationally symmetrically. It is certainly realized toward the component side 12 in the manner of a part cylinder and toward the machine side 14 as a substantially block-shaped element. As can additionally be found in FIGS. 2 and 3, the main part 16 contains exclusively, and additionally exclusively toward the machine side 14, a cooling structure formed by cooling ribs 22. The drive housing 10 consists overall preferably of a metallic light construction material with good thermal conductivity, in particular aluminum.

On the machine side 14 in the block-shaped part of the drive housing 10, inlet openings of cooling channels can be seen, namely of one (single) feed channel 24a and multiple outlet channels 24b. Electric connector plugs 26 for a power supply and also for data connection of control lines can additionally be seen on the machine side 14. A blower 28 can also be seen inside the feed channel 24a. In operation, where necessary, a cooling fluid, in particular ambient air, is sucked-in b the blower 28 and by the cooling channels 24*a*, 24*b* and conducted through the interior of the drive housing 10 and output again via the outlet channels 24*b*.

Figure 4:
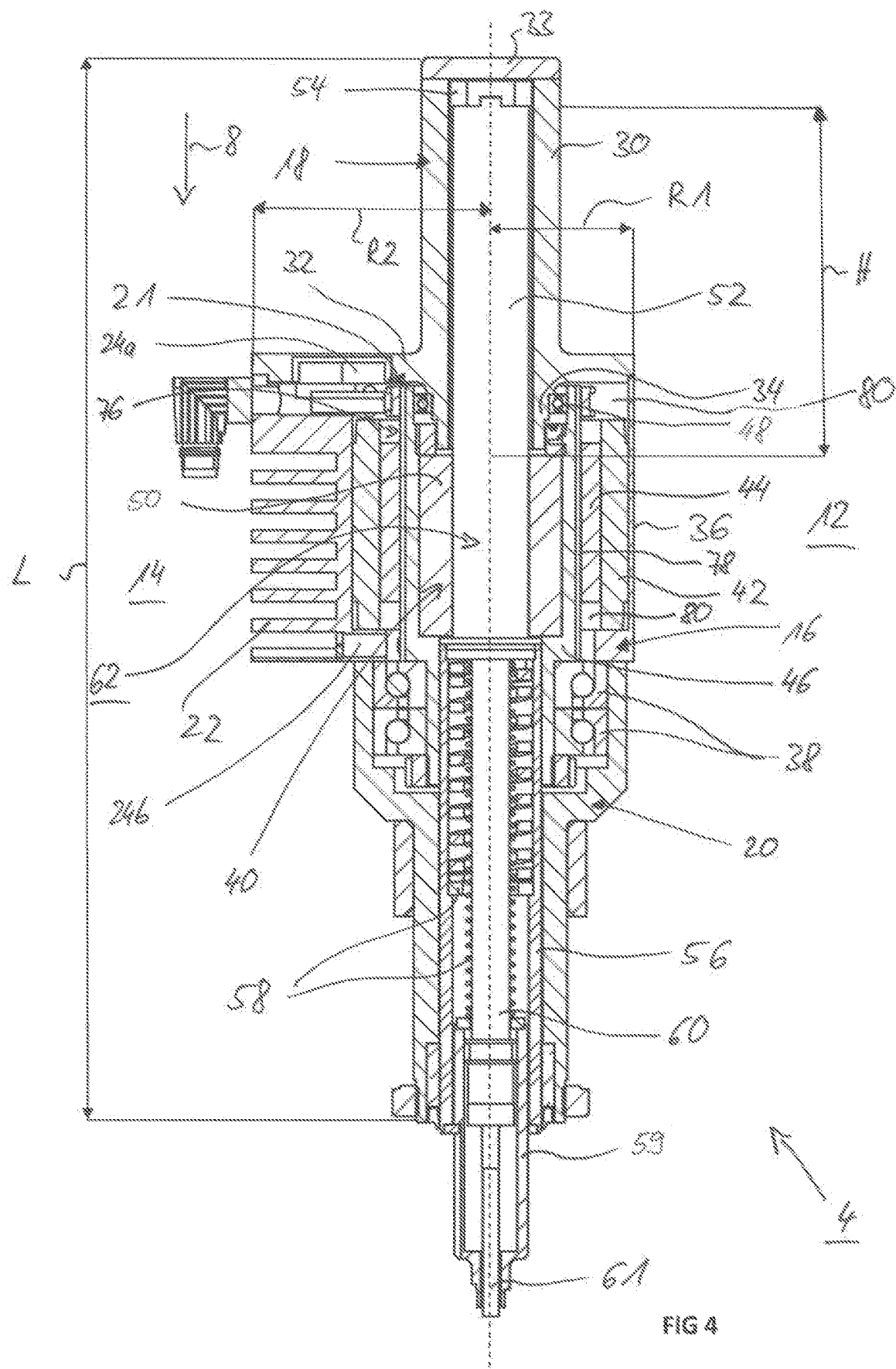
FIG. 4 is a longitudinal sectional view through the drive unit according to FIG. 2.

The design of the drive unit 4 is produced in particular from the sectioned representation in FIG. 4 and additionally also from the perspective representations in FIGS. 5 and 6.

The three housing parts—rear guide part 18, main part 16 and front further guide part 20—can be seen in the sectioned drawing. The rear guide part 18, in this case, contains a tubular, rear part region 30 which reaches up to a fastening flange 32 and which is closed by a cover 33 at the oppositely situated end. A support part 34 of the part region 30 projects into the main part 16. The fastening flange 32 contains, in this case, the identical asymmetric cross-sectional contour as the main part 16, as is shown in particular by a comparison of FIGS. 5 and 6.

The main part 16 contains toward the component side 12 simply one thin housing wall 36. The thickness of the wall, in this case, is within the range of a few millimeters between 2 and 4 mm. The comb-like structure for the realization of the cooling ribs 22 can be found on the machine side 14. The further front guide part 20 connects to the main part 16 in the axial direction 8. The further front guide part is also realized in a tubular manner. It is realized in a stepped manner in this connection and is tapered toward the front. A front bearing 38 is arranged in the rear widened part region, in particular two roller bearing rings being arranged for this purpose in the exemplary embodiment.

A direct drive 40, which is realized as a servomotor, is realized in the main part 16. The direct drive includes a stator located on the outside which is formed by a corresponding stator pack 42 as well as an inside rotor which is formed by a rotor pack 44 and a rotor sleeve 46. The rotor rotates in operation about a rotational axis shown by the broken line in FIG. 4. The rotor pack 44, in this case, is fastened on the outside of the rotor sleeve 46. The rotor sleeve 46 is tapered in a step-like manner and contains a front bearing region which is mounted in the front bearing 38 toward the outer wall of the further guide part 20. In the rear part, the rotor sleeve 46 is mounted on the inside by a rear bearing 48, the rear bearing 48 being arranged between the support part 34 and the rotor sleeve 46. As can easily be seen, the front bearing 38 is clearly larger than the rear bearing 48 as considerably larger forces have to be absorbed in the region of the front bearing 38. The design and arrangement of the rear bearing as an inner bearing between the rotor sleeve 46 and the support part 34 are worth pointing out. As a result, a very compact design can be achieved with only a small radial extent R1 toward the component side 12.

On account of the asymmetric design of the main part 16, the radial extent R2 toward the machine side 14 is clearly larger.

The rotor sleeve 46 is fixedly connected on the inside to a spindle nut 50 such that, in operation, a rotational movement of the rotor is transmitted to the spindle nut. A spindle 52, which is mounted so as to be slidingly displaceable inside the tubular part region 30, is received by the spindle nut 50.

FIG. 4 shows a situation with the spindle 52 retracted fully into the rear position. The spindle can be displaced forward by a feed stroke H in the axial direction 8.

At the maximum feed stroke H, the rear end of the spindle 52 is situated at the height of the fastening flange 32 or somewhat above the rear bearing 48.

The spindle 52 is guided non-rotatably inside the guide part 18. To this end, an anti-rotation element in the form of a somewhat block-shaped plate 54 is fastened on the rear end of the spindle 52. The anti-rotation element contains beveled corner regions. On account of the polygonal design and complementary guiding inside the guide part 18, the spindle 52 is consequently guided in a non-rotatable manner.

A plunger 56, which is preferably realized as a tube and in which two spring elements 58 with different spring hardnesses are arranged in the exemplary embodiment, connects to the spindle 52 in the front part region. The spring elements 58, in this case, are each realized as compression springs (helical springs). A hold-down device 59, which emerges out of the front of the plunger 56, is guided so as to be slidingly displaceable inside the plunger 56. The hold-down device 59, in this case, is resiliently mounted in opposition to the spring force of one of the two spring elements 58. In addition, a punch 60 is mounted so as to be sliding displaceable inside the hold-down device 59. In the exemplary embodiment, another compression rod 61 is fastened in particular on the end of the punch 60 so as to be exchangeable. The compression rod 61 is connected to the spindle 52 in this connection just as the plunger 56. The three components 52, 56, 61 together form, in this case, an actuator element 62. If the spindle 52 is displaced forward by the feed stroke H, the plunger 56 moves, and with it the compression rod 61, out of the front further guide part 20.

Overall, the drive unit 4 contains an overall length L which is defined by the distance between the rear end of the guide part 18 and the front end of the further guide part 20. On the front end of the further guide part 20, the drive unit 4 is held on the holder 6 (FIG. 1) overall by, for example, a holding element 64 in the manner of a clip.

A feed unit, which is not shown here in any more detail and by which the individual connecting elements, in particular self-piercing rivets, are fed in singles and then are set by the punch 60, additionally connects at the front in the axial direction 8.

The realization variant shown here with the plunger tube 56 and the hold-down device 56 is realized for a special self-piercing rivet application. In the case of other designs, the hold-down device 56, for example, is not integrated into the drive unit 4.

On account of the high setting forces occurring during operation, in particular in the case of an abrupt increase during the punching operation when inserting a punching element, for example a self-piercing rivet, into a component, the transmission of a high torque between the spindle 52 and the drive housing 10 is necessary.

In order to obtain a compact design, in particular as small an extent as possible in the radial direction R1, the drive housing 10 is realized for asymmetrical torque absorption in a connecting region 21, that is to say in the region of the fastening flange 32. To this end, it is provided, in particular, that the fastening flange 32 contains on its underside an asymmetrical engagement contour 68 which corresponds in a corresponding manner to a receiving contour 70 of the main part 16. The engagement contour 68 is formed, in this case, by an approximately plate-shaped shoulder on the underside of the fastening flange 32, the plate containing a peripheral contour which is realized toward the component side 12 as a part circle and toward the machine side 14 as a polygon and is realized in particular in the manner of a triangle. The lateral surfaces of the plate of the engagement contour 68 define, in this case, torque transmitting elements and in particular torque transmitting surfaces 72. The receiving contour 70 of the main part is realized in a precisely complementary manner to the engagement contour 68. The two parts are consequently inserted into one another in a play-free manner. On account of the part-circular design toward the machine side 14, torque transmission is effected exclusively on the machine side 14.

As can be seen in particular from FIG. 6, fastening elements 74 (screws), which serve for the axial securement of the rear guide part 18 on the main part 16, are arranged on the machine side 16. The fastening elements, however, do not absorb any torque forces.

A further aspect, independent of the special design of the torque entrainment, is internal cooling in the region of the motor components, that is to say in the region of the stator pack 42 and of the rotor pack 44. A free interior 76, in which the individual motor components are arranged, is defined inside the main part 16. The internal cooling is now characterized in that cooling air, which flows along the motor components in the axial direction 8 through the main part 16 and then leaves the main part again by the outlet channels 24$b$, is introduced into the free interior by means of the feed channel 24$a$. The flow configuration of the cooling air can also be seen in particular in FIGS. 5 to 7.

First flow channels, which are realized as grooves 78A and extend in the axial direction 8, are provided in order to enable the flow configuration of the cooling air. Spaces and gaps 78B inside the rotor pack 44, that is to say in particular spaces between the individual magnets 79, are preferably additionally utilized as second flow channels and are traversed in operation by cooling air (variant according to FIG. 7).

The flow channels (grooves 78A or gaps 78B), in this case, connect a rear annular chamber 80 on the inflow side to a front annular chamber 80 on an outflow side (cf. FIG. 4). The fed air is distributed over the periphery of the rear annular chamber 80 and flows forward via the flow channels such that uniform cooling is achieved about the entire periphery. The flow channels are preferably arranged equally distributed about the periphery.

According to a first variant shown in FIGS. 5 and 6, the grooves 78A are realized on the outside of the rotor sleeve 46. The grooves 78A consequently extend directly beneath the rotor pack 44.

The grooves 78A, however,—as shown in FIG. 7—are preferably arranged on the side of the rotor sleeve 46 located opposite the rotor pack 44. They can be realized in an inner lateral surface of the rotor sleeve 46. In the exemplary embodiment, they are mounted in an outside lateral surface of the spindle nut 50. As a result of the arrangement, the electro-mechanical design of the motor components remains uninfluenced by the grooves 78A. Immediate, direct cooling of the rotor components is achieved at the same time.

It can be seen in general from FIG. 7 that the spindle 52 is surrounded concentrically by the spindle nut 50, to which, once again, the rotor sleeve 46 is fastened in a directly abutting and non-rotatable manner. The rotor pack 44 is provided with a plurality of magnets 79 on the outside of the rotor sleeve 46. The gaps 78B are realized in each case between adjacent magnets 79. Leaving a small motor gap, the rotor pack 44 is surrounded by the stator pack 42 which is ultimately surrounded by the housing of the main part 16. It is easy to see the trapezoidal cross-sectional area with the solid cooling ribs 22 on the machine side 14 and on the component side 12 the at least semi-circular design which merges into the trapezoidal machine side 14 in a preferably aligning and shoulder-free manner.

The (flow) cross sectional area formed by the sum of the grooves 78A, in this case, is preferably larger than the (flow) cross sectional area formed by the sum of the gaps 78B. It is preferably more than 50% larger and in particular approximately twice the size. The sum of the grooves 78A and of the gaps 78B define an overall cross-sectional area. This is equal to or larger than a cross sectional area of the feed channel 24$a$. In a preferred manner, in addition, the cross-sectional area of the feed channel 24$a$ is equal to the sum of the cross-sectional areas of the outlet channels 24$b$ (cf. FIG. 3).

The following is a summary list of reference numerals and the corresponding structure used in the above description of the invention:

2 Setting device
4 Drive unit
6 Holder
8 Axial direction
10 Drive housing
12 Component side
14 Machine side
16 Main part
18 Guide part
20 Further guide part
21 Connecting region
22 Cooling ribs
24$a$ Feed channel
24$b$ Outlet channel
26 Connector
28 Blower
30 Tubular part region
32 Fastening flange
33 Cover
34 Support part
36 Housing wall
38 Front bearing
40 Direct drive
42 Stator pack
44 Rotor pack
46 Rotor sleeve
48 Rear bearing
50 Spindle nut
52 Spindle
54 Anti-rotation element
56 Plunger
58 Spring element
59 Hold-down device
60 Punch
61 Compression rod
62 Actuator element
64 Holding element
68 Engagement contour
70 Receiving contour
72 Torque transmitting surface
74 Fastening element
76 Free interior
78A Groove
78B Gap
79 Magnet
80 Annular chamber
R1, R2 Radial extent
H Feed stroke
L Overall length The invention claime is:
1. A drive unit for a setting device, the drive unit comprising:
an electric direct drive having motor components including a rotor pack and a stator pack;
an actuator element being displaceable linearly in an axial direction by said electric direct drive and surrounded concentrically by said motor components; and a drive housing extending in the axial direction and having an interior in which said motor components and said actuator element are received, said drive housing containing:
  a front component side;
  a rear machine side;
  a main part;
  a guide part connected to said main part in a connecting region, said actuator element being guided non-rotatably in said guide part, said connecting region being realized for transmitting torque; and
  said main part and said guide part in said connecting region, when viewed in a plane perpendicularly to the axial direction, are formed asymmetrically for asymmetrical torque transmission and have torque transmitting elements disposed for the asymmetrical torque transmission such that a main part of the asymmetrical torque transmission is effected on said machine side.

2. The drive unit according to claim 1, wherein said connecting region is realized in such a manner that the asymmetrical torque transmission is effected exclusively on said machine side.

3. The drive unit according to claim 1, wherein said main part has a thin housing wall on said component side and a solid wall on said machine side.

4. The drive unit according to claim 1, wherein said main part and said guide part interlock in a form-locking manner and define an asymmetric engagement contour having torque transmitting faces.

5. The drive unit according to claim 4, wherein said asymmetrical engagement contour, when viewed perpendicular to the axial direction, is a part-circle toward said component side and polygonal toward said machine side.

6. The drive unit according to claim 5, wherein said guide part contains a fastening flange and said asymmetric engagement contour is realized on an underside of said fastening flange.

7. The drive unit according to claim 1, wherein said guide part has a tubular rear part region in which said actuator element is guided so as to be slidingly displaceable.

8. The drive unit according to claim 1,
  wherein said electric drive unit is configured for a defined feed stroke for which said actuator element is situated in an extended position; and
  further comprising an anti-rotation element, said anti-rotation element is guided so as to be slidingly displaceable inside said guide element, is fastened additionally on said actuator element for a non-rotatable bearing configuration of said actuator element, wherein in an extended position, said anti-rotation element is positioned at an axial height of said connecting region.

9. The drive unit according to claim 1,
  further comprising a spindle nut;
  wherein said actuator element is realized in a rear region as a spindle being partially surrounded by said spindle nut; and
  wherein said electrical direct drive has a rotor sleeve and said rotor pack is connected to said spindle nut, said spindle nut is fastened on an inside of said rotor sleeve and said rotor pack is fastened on an outside of said rotor sleeve.

10. A drive unit, comprising:
  an electric direct drive containing motor components including at least one rotor packet and one stator pack;
  an actuator element being displaceable linearly in an axial direction by said electric direct drive and surrounded concentrically by said motor components;
  a drive housing extending in the axial direction and having a main part with an interior, in said drive housing said motor components and said actuator element are received; and
  a cooling device disposed in said main part for an internal cooling of said motor components by means of a fluid flowing into said interior.

11. The drive unit according to claim 10, wherein at least one of said motor components has grooves formed therein as flow channels for the fluid.

12. The drive unit according to claim 10, further comprising a carrier and one of said motor components is fastened on said carrier and said carrier has grooves formed therein.

13. The drive unit according to claim 10, further comprising a carrier and one of said motor components is fastened on said carrier and carrier has a side with grooves formed therein and disposed opposite said rotor pack or said stator pack.

14. The drive unit according to claim 11, wherein said one motor component has magnets and said flow channels include first flow channels and second flow channels being defined by gaps between said magnets inside said one motor component.

15. The drive unit according to claim 11, wherein:
  said cooling device has a feed channel; and
  said flow channels form an overall cross-sectional area which is greater than or equal to a cross sectional area of said feed channel.

16. The drive unit according to claim 10, wherein said interior defines a free annular space for the fluid on an inflow side and also on an outflow side which is at a spacing from said inflow side in the axial direction.

17. The drive unit according to claim 10,
  wherein said cooling device has a cooling channel; and
  further comprising a pump element for circulating the fluid, said pump element is directly integrated into a channel portion of said cooling channel.

18. The drive unit according to claim 10, wherein a flow chamber of the fluid is sealed toward said actuator element inside said interior.

19. A drive unit, comprising:
  an electric direct drive containing motor components including a rotor pack and a stator pack;
  an actuator element being displaceable linearly in an axial direction by said electric direct drive and surrounded concentrically by said motor components;
  a drive housing extending in the axial direction and having an interior in which said motor components and said actuator element are received, wherein said drive housing containing:
  a front component side;
  a rear machine side;
  a main part; and
  a guide part connected to said main part in a connecting region, said actuator element being guided non-rotatably in said guide part; and
  said actuator element being extendable by an actuating stroke and said electrical drive unit having an overall length corresponding to twice the actuating stroke plus a constant of between 70 and 100 mm.

20. The drive unit according to claim 9, further comprising a plunger, said plunger and said spindle are realized in one piece without mechanical connecting elements.

\* \* \* \* \*